Feb. 26, 1935. P. J. DARLINGTON 1,992,606
CALIPERING DEVICE
Filed March 4, 1931 4 Sheets-Sheet 1
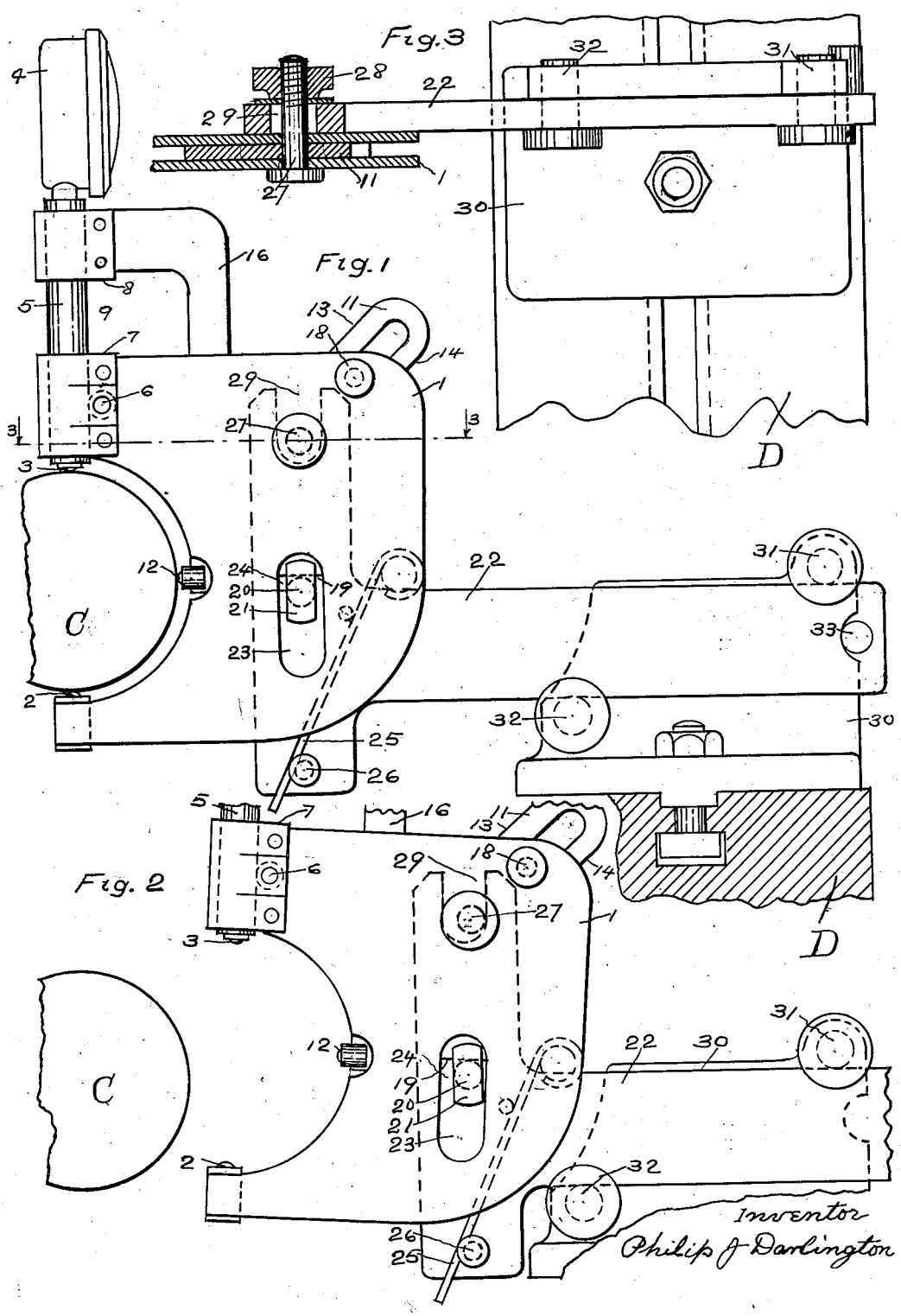
Inventor
Philip J Darlington

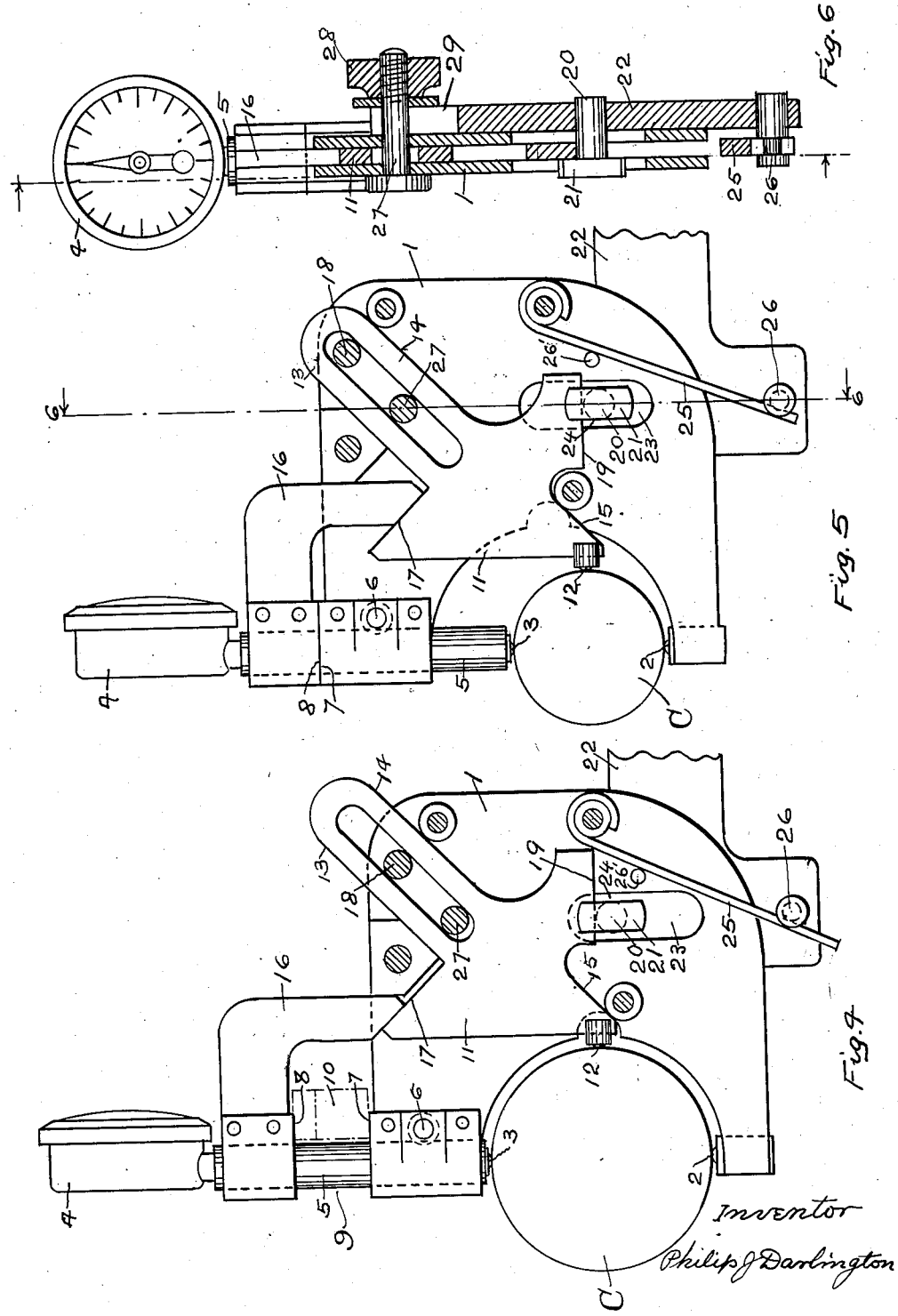

Feb. 26, 1935. P. J. DARLINGTON 1,992,606
CALIPERING DEVICE
Filed March 4, 1931 4 Sheets-Sheet 3
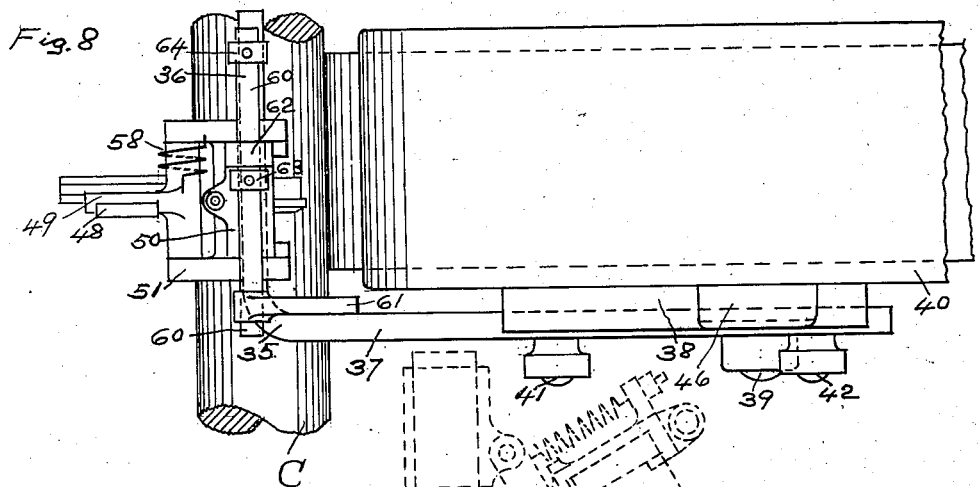
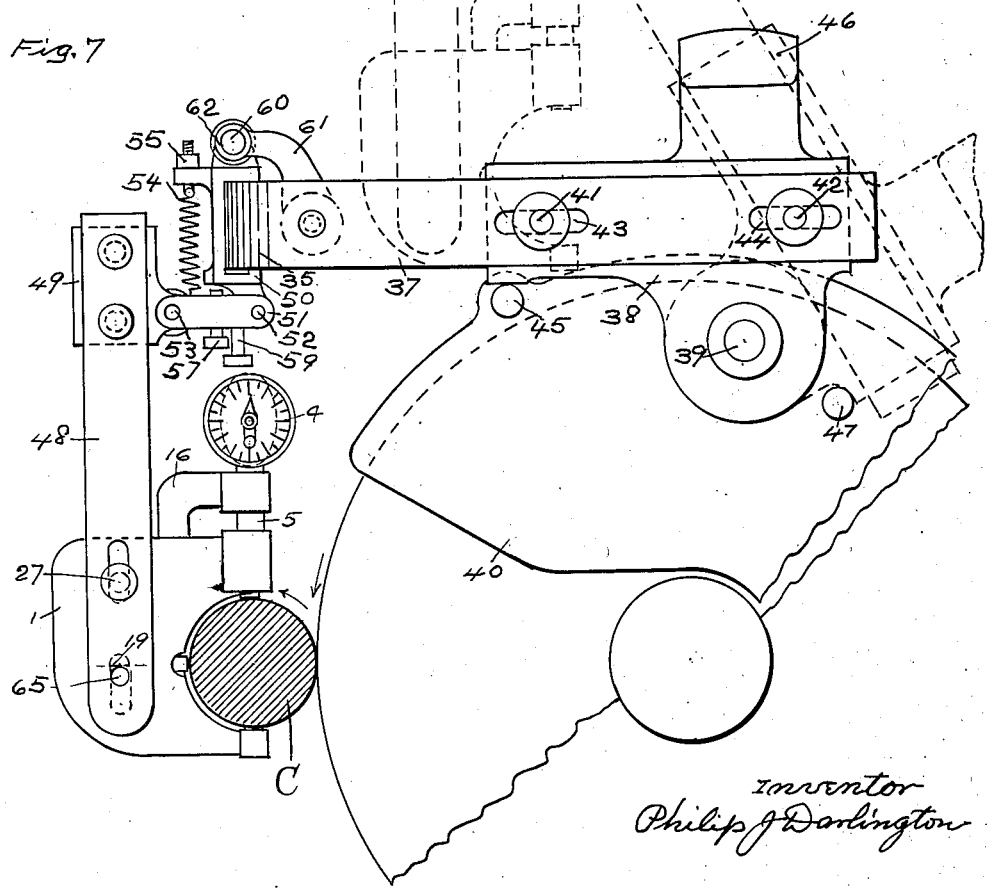
Inventor
Philip J. Darlington Feb. 26, 1935. P. J. DARLINGTON 1,992,606
CALIPERING DEVICE
Filed March 4, 1931 4 Sheets-Sheet 4
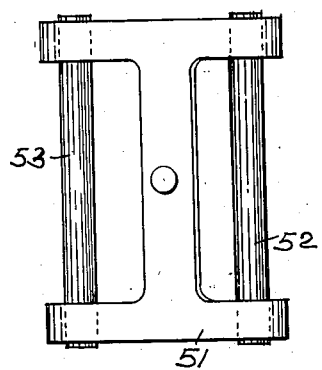
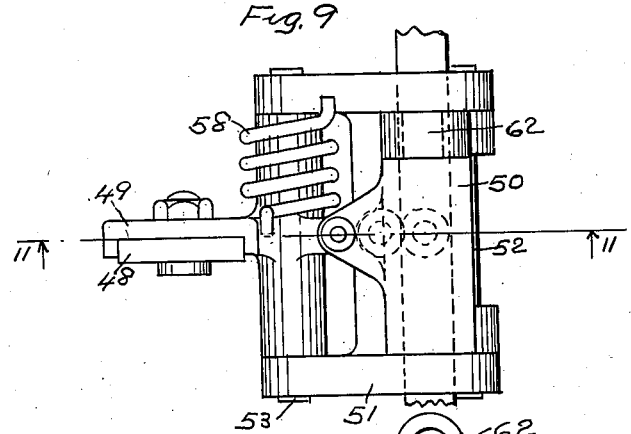
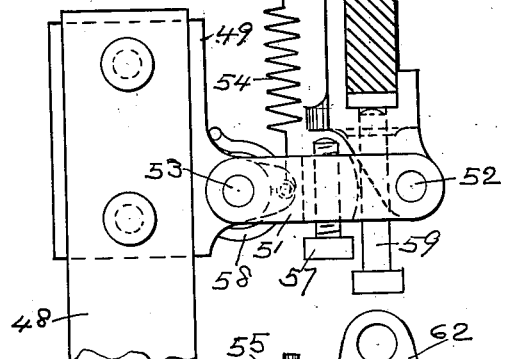
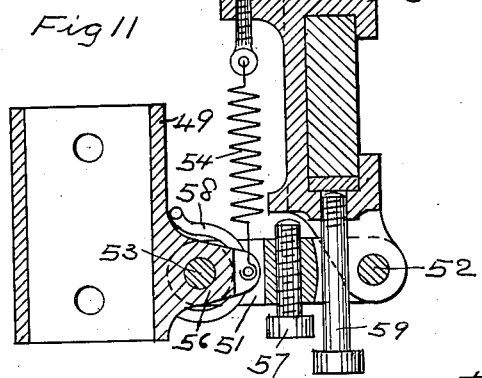
Inventor
Philip J. Darlington Patented Feb. 26, 1935

1,992,606

UNITED STATES PATENT OFFICE 1,992,606

CALIPERING DEVICE

Philip J. Darlington, Cambridge, Mass.; Rebecca T. M. Darlington executrix of said Philip J. Darlington, deceased Application March 4, 1931, Serial No. 520,165

13 Claims. (Cl. 33—147)

This invention relates to calipering devices, especially to those applicable to cylindrical work while it is mounted between centers or on its journals, as in continuous measuring during the process of reduction to size.

The object of the invention is to provide a device which can be used with greater speed and precision, and can be adjusted to different sizes and uses more quickly than similar devices heretofore.

Figure 1 is a side elevation showing my invention applied to the measurement of a cylinder.

Figure 2 is a similar view showing the caliper member drawn back to change cylinders.

Figure 3 is a plan view of a part section on the line 3—3 of Figure 1.

Figure 4 is a side elevation of the caliper member with one side frame removed.

Figure 5 is a view similar to Figure 4, but showing the caliper member adjusted to a smaller diameter.

Figure 6 is a vertical section through the line 6—6 of Figure 5.

Figure 7 is a side elevation view, to reduced scale, of a modified form of my invention, adapted to overhead support from the wheel guard of a grinding machine, showing, in broken lines, the position of the device when swung open to receive the work.

Figure 8 is a plan view of the device shown in Figure 7.

Figure 9 is a plan view, to enlarged scale, of the carriage and suspension parts.

Figure 10 is an elevation view of the same.

Figure 11 is a vertical section on the line 11—11 of Figure 9.

Figure 12 is a plan view of the fork member with its pivots.

My invention comprises a caliper frame 1 having a fixed lower contact member 2 and a yielding upper contact member 3 adapted to span the cylinder or work C being measured. An amplifying gauge or indicator 4 cooperates with the contact members to indicate the movement of the yielding contact member. The upper contact member 3 and the gauge 4 are mounted in a member 5, which is adjustable in the frame 1 toward and from the lower contact member 2 and is clamped in adjusted position by a screw 6. The indicator 4 may be of conventional type with spring depressed plunger and the yielding contact 3 may be urged by the work to move the plunger against its spring or may be spring urged in the opposite direction to a limited extent to follow the work as the conditions may require.

Opposed parallel setting surfaces 7 and 8 are formed on the frame 1 and member 5 respectively, forming an adjustable space 9 between them, and arranged to temporarily receive, and to be closed upon, a precision gauge block combination 10, shown in dotted lines Figure 4, measuring a desired difference in adjusted diameter of the caliper. The space 9 is preferably equal to, or less than, the distance between the lower and upper contact members 2 and 3.

A centering member 11 having a centering contact member 12 is adjustably supported in the frame on inclined parallel surfaces 13, 14 and 15, preferably formed on the centering member 11 at an angle of 45° to the axis of the gauge supporting member 5. A projecting arm 16 of the member 5 bears upon a surface 17 formed on the member 11 at 90° to the inclined surfaces 13, 14 and 15, whereby adjustment of member 5 and arm 16 in the frame 1 provides an adjustment of member 11 in the direction of the inclined surfaces, producing a movement of said member 11, relatively to the frame, equal to one-half the travel of member 5, thereby relocating the three contact members at the opposite and mid-points of the new but concentric circle. A clamping screw 18 is arranged to secure member 11 in adjusted position.

The centering member 11 has a horizontal surface 19 by which the instrument is supported on a pin 20 having a head 21 carried by a supporting arm 22 and passing through a vertical slot 23 in the frame 1. This arm 22 is normally carried by a stand 30 which in turn is mounted on a suitable stationary support D. Side clearance spaces 24 between the pin and the slot permit a small range of horizontal movement of the frame 1 on the pin 20.

A spring 25 carried by the frame 1 bears against a stop pin 26 in the supporting arm 22. A fixed pin 26' mounted in the frame 1 cooperates with spring 25 to press the frame forward and rock it on the pin 20 in the direction to keep the lower contact member 2 and the center contact member 12 against the cylinder C, being calipered. A threaded bolt 27, with a normally loose nut 28, is carried by the frame 1 and passes through an open end slot 29 in the top of the supporting arm 22 arranged to normally limit the rocking movement of the frame 1 when the device is removed from the work as clearly shown in Figure 2. The screw thread is extended toward the head of bolt 27 to permit the tightening of the nut 28, if desired, to clamp the frame 1 to the arm 22.

By holding the lower contact off the work and tightening nut 28 the frame is clamped to its support with only the upper and centering contacts on the work. The gauge then reads the eccentricity of the cylinder revolving on its centers or journals.

The stand 30 has headed pins 31 and 32 arranged to slidably support the arm 22, but spaced apart to allow the removal of the arm if turned up to an inclined position. A stop pin 33 in the outer end of the arm normally engages the stand 30 to limit the forward travel and thus horizontally locate the instrument on the work.

It should be noted that the member 11, supporting the centering contact 12, has no vertical adjustment, its movement being restricted to a horizontal plane due to the surface 19 always being in contact with the pin 20 which is fixedly mounted in the support 22. Obviously, there must be a fixed relation between said pin 20 and the horizontal axial plane of the work cylinder C. I have shown the surface 19 in the horizontal plane of said axis for convenience but this is not material so long as some fixed relation exists therebetween.

This action will be clearly understood by comparison between Figures 4 and 5. In changing to work of smaller diameter, it will be observed that member 11 has remained in the same vertical position but has moved horizontally toward the axis of cylinder C. At the same time, the frame 1 has moved upwardly in a strictly vertical plane while the members 5 and 16 have moved downwardly in a similar plane. Adjustment back to a larger diameter of work would merely reverse these movements.

The modification shown in Fig. 7 and Fig. 8 is the adaptation of my device for attachment to the wheel head of a grinding machine, for continuously measuring, during the process of grinding a cylinder, to a required diameter.

A supporting member 35, having a longitudinal rail portion 36 parallel with the axis of cylinder C and a transverse arm 37, is adjustable in a bracket 38, which pivots on a pin 39 carried by the wheel guard 40. The arm 37 is secured in adjusted position by clamping bolts 41 and 42 passing through slots 43 and 44 respectively. A stop pin 45 carried by the guard 40, normally supports the bracket 38, arm 37, and rail 36 in horizontal position. A counterweight 46 and stop pin 47 retain the mechanism in the position shown by broken lines when the device is swung open to receive work.

The caliper frame 1 is attached by a vertical strap 48 to a suspension member 49 which is yieldingly supported by a carriage 50 adapted to slide on the rail 36. A double fork member 51 is hinged at one end to the carriage 50 on a longitudinal pin 52 and at the other end to the suspension member 49 on a similar and parallel pin 53.

A vertical spring 54, adjustable by a nut 55, acts between the carriage 50 and an arm 56 on the member 49 to lift the suspended weight and keep the lower contact member 2 against the work C or to keep an adjustable stop pin 57 against the carriage 50 when the caliper is removed from the work. The arm 56 extends beyond the center line of gravity of the suspended load to cause the lift of the spring 54, cooperating with gravity, to swing the caliper inward and keep the centering contact member 12 against the work. A supplemental spring 58 acts between the fork 51 and the suspension member 49 to further increase the pressure of the centering contact member 12 on the work.

The carriage 50 is adjustable along the rail 36 and is clamped in position thereon by a screw 59. A horizontal stop rod 60 is supported at one end in a bracket 61 mounted on the arm 37 and passes freely through a projection 62 on the carriage 50. Set screwed collars 63 and 64 are arranged to be adjusted and secured in any desired positions on the rod 60 to furnish stops for any two extreme positions of the carriage 50 on the rail 36.

The adjustable stops for the carriage are set to quickly locate the caliper at either end of a cylindrical section being ground by in-feed with a wide wheel, to locate the taper or distortion of the diameter produced, due to uneven wear of the wheel.

In the attachment of the frame 1 to the strap 48, the surface 19, Fig. 4, is rested upon a pin 65, Fig. 7, carried by said strap, and the frame 1 is secured in that position by the clamping bolt 27.

In the application and operation of my invention, the device is set for any desired diameter by closing the setting surfaces 7 and 8 onto the required thickness of gauge blocks 10. The mechanism automatically locates all three contact members for the new diameter, and adjusts the point of support relatively to the frame for all adjusted diameters. This maintains the same relative position of the contacts 2, 3 and 12 to the center line of the cylinder C, being measured and requires no adjustment of supports, either vertically or horizontally, for different diameters. This greatly simplifies the processes demanded in changing from one size of work to another, and extends the profitable field of continuous calipering into operations of smaller quantities and greater variety.

It should be understood that the caliper is applied to the work continuously during the grinding or finishing process. A piece of work is placed in the machine, the caliper is swung into position as shown in Figure 7 and remains in contact with the work until the latter is reduced to the desired diameter as shown by the indicator 4. The caliper frame 1 and its associated parts is then swung outwardly away from the work around the pivot stud 53 and subsequently around the secondary pivot stud 39 to the position shown in dotted lines (Fig. 7). The counterweight 46 having passed the center of stud 39 retains the device in this position with the member 38 against the stop pin 47. A new piece of work may then be placed in the machine and the caliper applied thereto by reversing the foregoing operations, first bringing the member 38 into contact with the stop pin 45 and subsequently swinging the caliper into operative position around the pivot 53.

Any change to work of a different diameter is accomplished in the manner described in connection with my preferred form of construction.

For convenient terminology the assemblage of parts resting on the pins 20 or 65 may be considered as the caliper or caliper instrument and the three parts which are conjointly adjustable toward and away from the center line of the work in its support may be considered as caliper elements, the lower arm of frame 1 with its point or contact 2 constituting a lower caliper element, the adjustable member 5 with its yielding point or contact 3 constituting an upper caliper element diametrically opposed to the lower element, and the member 11 with its point or contact 12 constituting an intermediate caliper element. In certain aspects of the invention, one or the other of these elements may have the yieldable characteristic which may be effected by a yield of the point or contact or by a yield of a larger part or the whole of the element. In certain other aspects the invention may specifically relate to a particular one of these elements having the yielding quality or to the yielding effect being obtained by a relatively movable point or contact. It will be easily determinable in each of the appended claims whether the structure should be considered in its specific form or in a broader more generic form.

What I claim is:—

1. A caliper instrument comprising a frame having diametrically opposed caliper elements one of which has a yieldable point and is adjustable in said frame, another caliper element intermediate the said opposed elements and slidable in said frame, and means on said adjustable caliper element for moving said slidable caliper element, in combination with a support for said instrument having a member passing through an opening in said frame and primarily supporting said slidable caliper element.

2. A caliper instrument comprising a frame having diametrically opposed caliper elements one of which has a yieldable point and is adjustable in said frame, another caliper element intermediate the said opposed elements and slidable in said frame, and means on said adjustable caliper element for moving said slidable caliper element, in combination with a support for said instrument having a member passing through an opening in said frame and primarily supporting said slidable caliper element, and spring means between said support and said instrument for urging the caliper elements, other than the one with the yielding point, against the work to be calipered.

3. In a device of the character described, in combination, a support for a caliper instrument adapted to project from a machine for reducing material and being movable to carry the instrument into and out of calipering position, a calipering instrument comprising a frame recessed to receive a part of said support with clearance to allow for oscillatory and up and down movement of said instrument relative to said support, a caliper element mounted for sliding movement in said frame and resting on said support, a second caliper element on said frame spaced circumferentially from the first said caliper element, a third caliper element diametrically opposed to the second and slidably mounted in said frame for adjustment to different positions, a spring pressed point in said third caliper element, an indicator carried on said third caliper element and governed by movement of said point, and means on said third caliper element for transmitting adjusting movement thereof to the first said caliper element thereby causing a corresponding movement of the first said caliper element and a relative movement of the frame and its support.

4. In a device of the character described, in combination, a support for a caliper instrument adapted to project from a machine for reducing material and being movable to carry the instrument into and out of calipering position, a calipering instrument comprising a frame recessed to receive a part of said support with clearance to allow for oscillatory and up and down movement of said instrument relative to said support, a caliper element mounted for sliding movement in said frame and resting on said support, spring means urging the frame rotatively on said support, a second caliper element on said frame spaced circumferentially from the first said caliper element, a third caliper element diametrically opposed to the second and slidably mounted in said frame for adjustment to different positions, a spring pressed point in said third caliper element, an indicator carried on said third caliper element and governed by movement of said point, and means on said third caliper element for transmitting adjusting movement thereof to the first said caliper element thereby causing a corresponding movement of the first said caliper element and a relative movement of the frame and its support.

5. A device for calipering moving work comprising a caliper instrument having a pair of side members, opposed caliper points, an indicator adapted to show movements of one of said points, a member carrying a centering caliper point, slidably mounted between said side members and having a surface adapted to bear continuously on a support, and supporting means for the instrument, adapted to have a fixed relation to the machine carrying the work to be calipered, and comprising a member contacting the said bearing surface and a loose connection which allows moving of the instrument into and out of calipering position.

6. A device for calipering moving work comprising a caliper instrument having a series of radially adjustable circumferentially spaced caliper points, means for causing like adjustment of all points with respect to a constant common center upon the adjustment of a particular point, a supporting arm mounted on a machine housing and having a limited pivotal movement with respect thereto, a rail portion on said supporting arm parallel with the axis of work in said machine, a movable carriage on said rail portion, pivotal link connections between said carriage and said caliper instrument, and a counter balance on said supporting arm adapted to hold said caliper instrument away from the work when not in use.

7. A caliper instrument comprising three circumferentially spaced caliper elements, two of which are diametrically opposed and the other of which is circumferentially intermediate the opposed elements, in combination with means for supporting the instrument by directly supporting the intermediate element, and means relating the three elements having provision for the radial adjustment of one of them and for causing simultaneous radial movement in like distances of the other two when said one element is adjusted.

8. A caliper instrument comprising three circumferentially spaced caliper elements, two of which are diametrically opposed and the other of which is circumferentially intermediate the opposed elements, and means permitting a range of adjustment of one of said elements, in combination with means for supporting the instrument by directly supporting the intermediate element, means relating the three elements for causing their conjoint radial movement in like distances when the adjustable element is adjusted, and resilient means slightly cocking the instrument on its supporting means when the caliper elements are out of engagement with the work so that when the instrument is engaged it will press at certain points against the work.

9. A caliper instrument comprising three circumferentially spaced caliper elements, two of which are diametrically opposed and the other of which is circumferentially intermediate the opposed elements, and means permitting a range of adjustment of one of said elements, in combination with means for supporting the instrument by directly supporting the intermediate element, means relating the three elements for causing their conjoint radial movement in like distances when the adjustable element is adjusted, one of said caliper elements having a characteristic of yield when the instrument is in engagement with the work, and an indicator adapted to show the extent of said yield.

10. A caliper instrument comprising three circumferentially spaced caliper elements, two of which are diametrically opposed and the other of which is circumferentially intermediate the opposed elements, and means permitting a range of adjustment of one of said elements, in combination with means for supporting the instrument by directly supporting the intermediate element, means relating the three elements for causing their conjoint radial movement in like distances when the adjustable element is adjusted, one of said caliper elements having a yielding contact point, and an indicator adapted to show movements of said point.

11. In a device of the character described, a support adapted to be attached to a machine for producing work to be gauged, a caliper instrument on said support comprising three spaced caliper elements one of which has a yieldable part and is adjustable to different positions relative to a constant center line of work in said machine, another of which is diametrically opposed to the first and the third of which is circumferentially intermediate the other two and is slidably mounted on said support, and means for moving the intermediate caliper element and the said diametrically opposed caliper elements conjointly a like amount toward or away, as the case may be, from said constant center line, when the first said caliper member is adjusted.

12. A device for calipering moving work comprising a support, a frame, a centering caliper element in said frame guided therein for sliding movement in a fixed path, opposed caliper elements in said frame one of which is adapted for adjustment and for being secured in different positions of adjustment in said frame, means on said one opposed caliper element for camming the centering caliper element to cause guided movement of it in said frame, said centering caliper element resting on said support and said frame being free to move relative thereto as the centering caliper element is cammed, and means for moving the frame upwardly when the centering caliper element is cammed by adjustment of said one opposed caliper element to thereby likewise simultaneously adjust the other opposed caliper element, one of said caliper elements having a movable point, and an indicator arranged to be governed by movement of said point.

13. A caliper having three circumferentially spaced points, means adapted to permit adjustment of one of the three points radially and secure same in adjusted position, means for causing a corresponding and simultaneous adjustment of the other two points with respect to a constant common center as said one point is adjusted, means supporting said caliper in relation to a machine for reducing work mounted on a constant center, having provision for allowing movement of the caliper toward and from the work and maintaining the caliper in a substantially fixed path as it is so moved, and an indicator associated with one of said points to show movement thereof.

PHILIP J. DARLINGTON.